United States Patent [19]

Linnert

[11] 4,027,853

[45] June 7, 1977

[54] VALVE PLATE HAVING IMPROVED SUCTION GAS FLOW PATH

[75] Inventor: Peter J. Linnert, La Crosse, Wis.

[73] Assignee: The Trane Company, La Crosse, Wis.

[22] Filed: May 3, 1976

[21] Appl. No.: 682,528

[52] U.S. Cl. .............................. 251/361; 137/454.4; 137/512

[51] Int. Cl.² ........................................ F16K 51/00

[58] Field of Search ............ 137/454.4, 512, 512.1; 251/361; 417/570, 571

[56] References Cited
UNITED STATES PATENTS 2,935,248  5/1960  Gerteis ...................... 137/454.4 X
3,112,064  11/1963  Ayling ......................... 137/454.4 X
3,124,154  3/1964  Kehler ......................... 137/454.4 X

*Primary Examiner*—Harold W. Weakley
*Attorney, Agent, or Firm*—Peter D. Ferguson; Carl M. Lewis

[57] ABSTRACT

A valve plate for use in a reciprocating gas compressor is disclosed wherein lower and upper members are held in spaced apart relation so as to define a suction gas flow path therebetween. A corrugated element is located in the flow path and bonded to said members, the corrugations thereof defining suction gas flow paths of minimal resistance, thus improving the efficiency of the compressor, while providing the support necessary between said lower and upper members.

17 Claims, 10 Drawing Figures

VALVE PLATE HAVING IMPROVED SUCTION GAS FLOW PATH

BACKGROUND OF THE INVENTION

1. Field of the Invention

The present invention relates to an improved valve plate for use in reciprocating gas compressors of the type commonly used in vapor compression refrigeration systems and in other applications.

With the advent of the energy crisis and its attendant increases in the costs of fuel and electricity, it has become desirable and necessary that energy consuming equipment be designed to operate at the highest possible efficiencies. This is especially true in the refrigeration industry as evidenced by pending regulations of the Federal Government which would impose minimum standards on system operating efficiencies. Accordingly, the valve plate of the present invention represents an improvement in compressor design so as to attain higher operating efficiency.

Reciprocating compressors of the type under consideration may be of at least two general configurations, as dictated by the cooperative relationship between the piston crown and its associated valve plate.

In a first type, the piston crown is substantially flat and coacts with a corresponding lower planar surface of the valve plate in order to effect compression. Discharge ports pass through the valve plate in an axial direction, terminating at its upper surface where a discharge valve member is located. This particular configuration thus presents a problem for the designer in that the discharge port volume contributes to the overall clearance volume of the compressor; a factor which would favor a valve plate of minimal thickness in order to reduce compressor clearance volume and thus increase its capacity and efficiency. Working against this requirement, however, is the problem of providing adequate suction gas flow area through the valve plate, a consideration favoring a valve plate of increased overall thickness.

In a second type of reciprocating compressor, its piston includes an upstanding annular crown which cooperates with a corresponding annular discharge port formed in part by the valve plate. This type of compressor is generally of relatively high performance in that its clearance volume may be reduced to a minimum valve. Although valve plate thickness is not as critical in this instance from the standpoint of reducing clearance volume, general design considerations would nonetheless favor a component of compact dimension while affording maximum suction gas flow area.

In summary, it is desirable in the design of valve plates of the type under consideration that overall thickness be minimized while providing a suction gas flow area of low resistance so as to maintain or increase compressor efficiency. Coupled with this consideration is the requirement that the valve plate be of sufficient strength to withstand the forces attendant in a reciprocating gas compressor.

2. Description of the Prior Art

It is conventional in the field of reciprocating compressors to provide a circular valve plate in overlying relationship to the cylinder bore which serves to control gas flow on the suction and discharge strokes of the piston. This is accomplished by the provision in the valve plate of radial flow paths for the suction gas extending from its periphery to suction port openings on a lower surface of the plate. Centrally located discharge port means extend through the valve plate in an axial direction. Gas flow through the valve plate is controlled by valve discs of the leaf or reed type which are disposed in overlying relationship to the ports, opening and closing in response to pressure changes in the cylinder on respective suction and discharge strokes of the compressor.

Valve plates have been proposed in the prior art which are of unitary construction, comprising a single disc-shaped element of predetermined thickness having discharge port means located in a central portion thereof, either in the form of a plurality of openings or a single circular bore to accommodate a corresponding upstanding piston crown, as described above. Suction gas flow passages are defined in such a valve plate by a plurality of radial bores extending from its periphery to an annular suction port opening located on a lower surface of the plate. This design has drawbacks in that expensive tooling is needed in order to accurately drill these radial flow passages, which further require careful deburring in order to provide proper gas flow characteristics and prevent damage to the compressor.

In order to obviate some of the manufacturing difficulties associated with the unitary design, it has been proposed that a valve plate be built-up from a plurality of laminated elements which are bonded to one another in a furnace brazing operation. Plates of this type have generally included lower and upper plate-like members in spaced relationship, with a centrally located axially extending element defining therebetween an annular suction gas flow area. Said element could either be a solid element through which a plurality of discharge port openings pass, or an annular element having a central bore to accommodate an upstanding annular piston crown. Within this annular flow area have been provided web-like or columnar elements for supporting the plate-like members at their outer peripheries. To date, these constructions have presented undesirable restrictions to suction gas flow within the valve plate itself.

SUMMARY OF THE INVENTION

The valve plate disclosed herein avoids the aforementioned drawbacks of the prior art through the use of an annular corrugated element which defines a low resistance suction gas flow path in the valve plate while providing sufficient structural support at the outer portions thereof.

In a preferred embodiment, the present valve plate is of laminated construction, including lower and upper members of substantially planar form which are maintained in spaced relationship. Centrally located means extend axially between said members so as to define therewith a suction gas flow are of annular configuration. Surrounding said means is the annular corrugated element as described above which is bonded to both the upper and lower members so as to define the suction gas flow path and add strength to the valve plate assembly. Discharge port means are disposed in a central portion of the plate, and may be defined by either a plurality of openings passing through both the lower and upper members and the axially extending means; or by a single tapered central bore in the valve plate which serves to accommodate an upstanding annular piston crown. Suction gas thus flows into the valve plate about its periphery, through relatively unrestricted channels formed by the corrugations, to suction port means in the lower member of the assembly.

The valve plate as described herein may be constructed of stamped components using well-known furnace brazing methods, resulting in a relatively low cost element while avoiding the need for expensive tooling for its manufacture.

It is therefore an object of the present invention to provide a valve plate for use in reciprocating gas compressors which exhibits minimal resistance to suction gas flow for a valve plate of a given thickness.

It is a further object of the present invention to provide a valve plate which may be constructed of laminated elements, thereby enabling the use of conventional furnace brazing techniques for its manufacture said avoiding the need for costly investments in tooling.

It is also an object of this invention to provide a valve plate of sufficient strength to withstand the forces to which it is subjected during operation of the compressor while maximizing its suction gas flow area and therefore its efficiency.

These and other objects of the invention will become apparent from the following description of a preferred embodiment and by reference to the accompanying drawings.

DETAILED DESCRIPTION OF THE DRAWINGS

Figure 1:
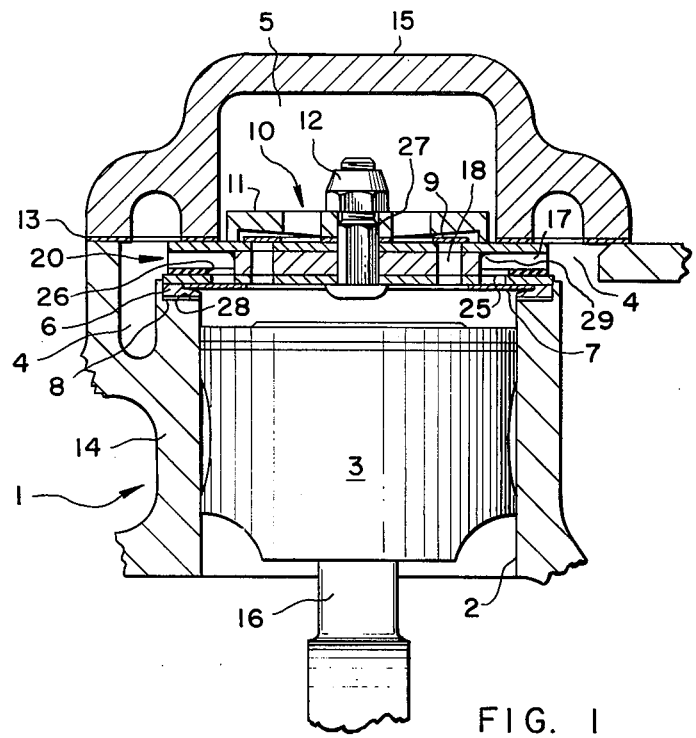
FIG. 1 is a partial sectional view of a reciprocating gas compressor including a valve plate according to a first embodiment of the present invention.

With reference to FIG. 1 of the drawings, there is illustrated a sectional view of a single cylinder of a reciprocating compressor, indicated generally by the reference numeral 1. It will be appreciated that, although only a single cylinder is illustrated for clarity, the invention has application not only in single cylinder compressors, but in multi-cylinder compressors as well.

A compressor housing 14 is provided, generally fabricated of cast metal, in which cylinder bore 2 is located to accept piston 3. As is well-known in the art, piston 3 is connected by rod 16 to a driven crankshaft (not shown) in order to impart reciprocating motion thereto. As piston 3 thus undergoes suction and discharge strokes, gas is alternately brought into the cylinder, compressed, and discharged therefrom.

An annular suction chamber 4 surrounds the upper portion of cylinder 2 and receives gas at a low pressure to be compressed. In the case of a refrigerant compressor, it is common to pass the suction gas over its driving motor for cooling purposes prior to its admission to suction chamber 4. A cylinder head 15 is secured atop housing 14 so as to define therewith a discharge chamber 5. Gasket means 13 insure a gas-tight seal therebetween.

Separating suction chamber 4 from discharge chamber 5 is a valve plate assembly generally indicated at 10, the function of which is to control gas flow on respective suction and discharge strokes of the compressor. The valve plate assembly includes valve plate 20, to be described in detail hereinafter, discharge valve 9, and discharge valve stop 11; which elements are maintained in the position shown by a bolt and lock nut combination 12. As may be seen in FIG. 1, the shank portion of the bolt is of polygonal cross-section to match the respective bores in valve plate 20, valve 9, and valve stop 11. In this manner, assembly of the components is facilitated since the bolt is restrained from rotation during tightening of the nut. Discharge valve 9 overlies ports 18, as shown in phantom in FIG. 2, and flexes upwardly during the discharge stroke of the compressor, the extent of its movement being limited by valve stop 11.

Also making up valve plate assembly 10 are suction valve 7 and its associated valve stop 6. As is evident from FIG. 1, the aforementioned element rest on an annular shoulder 28 machined within housing 14 and concentric with cylinder bore 2. A hardened metal ring 8 provides a seat for the valve plate assembly which is clamped in the position shown under the influence of cylinder head 15. As piston 3 undergoes its suction stroke, valve 7 flexes at its center portion to expose suction ports 25 (See FIG. 3), allowing the cylinder to fill with gas. Valve stop 6 serves to limit the extent to which valve 7 may open.

Operation of the valve plate assembly will now be described with reference to FIG. 1. As piston 3 commences its suction stroke, suction valve 7 is urged to its open position under the influence of reduced cylinder pressure, whereby gas to be compressed may flow from annular suction chamber 4 into valve plate 20 about its periphery, through suction gas flow path 17, and into the cylinder via suction port openings 25. Upon completion of the suction stroke, valv 7 closes and piston 3 begins its discharge stroke, forcing compressed gas into discharge ports 18 thereby causing discharge valve 9 to assume its open position and allow the compressed gas to enter discharge chamber 5. Upon completion of the discharge stroke, valve 9 returns to its closed position and the cycle is repeated.

FIG. 1 also serves to graphically illustrate the considerations which must be taken into account in the design of valve plate 20. The requirement that discharge ports 18 occupy a small volume so as to minimize the clearance volume of the compressor clearly calls for a valve plate of reduced overall thickness, while the requirement that suction gas flow path 17 offer minimum flow resistance would favor a plate of increased overall thickness. Coupled with the above considerations is the requirement that the valve plate be of sufficient strength to withstand the varying pressure forces to which it is subjected during operation of the compressor.

That these and other requirements have been met by the valve plate of the present invention will become apparent from the detailed description of the valve plate 20 which follows.

Turning now to FIGS. 2 through 5 of the drawings, the details of valve plate 20, illustrating a first embodiment of the invention, may be readily understood. As best seen in the exploded view of FIG. 4, the valve plate is fabricated as a laminate, including a lower member 22, an upper member 21, and axially extending means in the form of circular spacer element 23 located therebetween. Members 21 and 22 define at their outer circumferential portions substantially planar surfaces which face each other in spaced relationship, cooperating with spacer element 23 to define a suction gas flow area of generally annular configuration. Located in the suction gas flow area and bonded to the lower and upper members is a corrugated element 24 which provides support necessary at the outer portions of the valve plate while defining therein a plurality of low resistance suction gas flow paths.

As used herein, the term "corrugated" is to be construed according to its ordinary dictionary meaning: that is, "having plurality of alternating wrinkles or folds".

Figure 2:
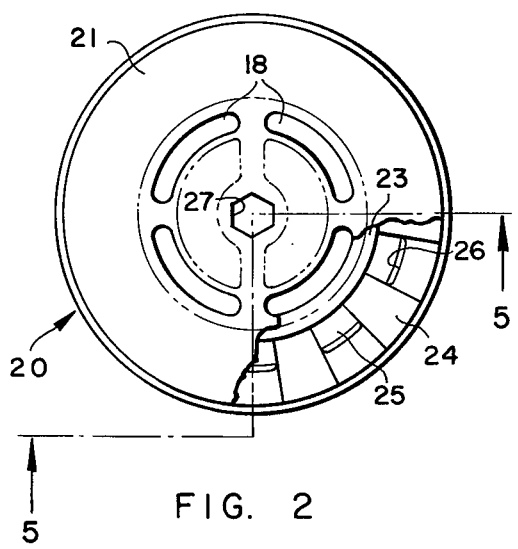
FIG. 2 is a top view, partially cut away, of the valve plate according to a first embodiment of the present invention.
Figure 3:
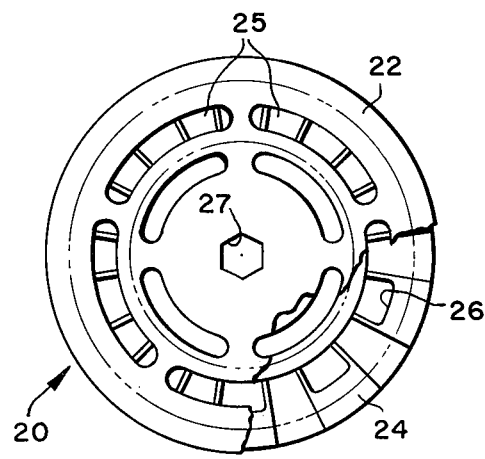
FIG. 3 is a bottom view, partially cut away, of the valve plate according to a first embodiment of the present invention.

As best seen in FIGS. 2 and 3, the corrugated element is of generally annular configuration and surrounds spacer element 23, substantially filling the space defined between the lower and upper members. It may be noted from the cut-away portions of FIGS. 2 and 3 that the individual corrugations of element 24 extend in a radial direction with respect to the valve plate from a point adjacent its periphery to a point in overlying relationship to arcuate suction port openings 25 in lower member 22. For this reason, it is necessary that radially inner portions of alternate corrugations which would otherwise block off suction port openings 25 be cut away, as indicated at 26. It is of interest further to note that, as shown in FIGS. 1 and 2, cutaway portions 26 are dimensioned so as to be spaced a slight distance from suction port openings 25. In this manner a more gradual transistion is presented to the incoming suction gas, resulting in more efficient flow therethrough. Also contributing to the flow characteristics of the valve plate is the small fillet of brazing compound, shown at 29, which accumulates during the brazing operation.

Passing through central portions of lower member 22 and upper member 21, and through spacer element 23, are a plurality of arcuate discharge port openings 18 as shown and described with respect to FIG. 1. Also shown is polygonal bore 27 extending through the valve plate in order to facilitate its assembly as described above.

Although the axially extending means is shown as a separate spacer element 23, it is within the scope of the present invention that such means could be provided as an integral extension of either lower plate 22 or upper plate 21. Further, lower member 22 could be of annular configuration surrounding element 23, resulting in a continuous annular gap therebetween defining the suction port opening. In the case of a compressor wherein two or more cylinders are disposed in side-by-side relationship, a single valve plate of elongated configuration may be provided in overlying relationship thereto, having appropriate suction and discharge port openings.

Figure 5:
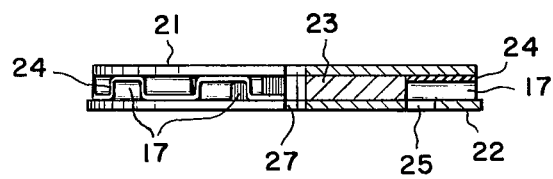
FIG. 5 is a side elevation view of the valve plate according to a first embodiment of the present invention, taken along the line 5—5 of FIG. 2.
Figure 4:
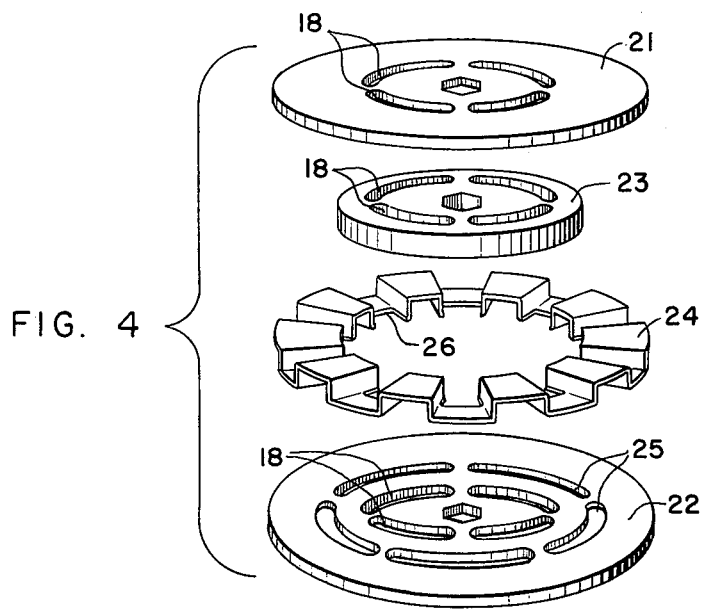
FIG. 4 is an exploded view, in perspective, of the valve plate according to a first embodiment of the present invention.

The laminated valve plate of the present invention may be fabricated using conventional furnace brazing techniques as follows: Brazing material is applied to elements 21, 22, 23, and 24 at the surfaces where they are to be bonded to one another and the resulting assembly is temporarily staked together, as by a pin which may pass through the center of the assembly and subsequently form a permanent part thereof. The assembly is then passed through a brazing furnace at elevated temperature, resulting in a securely bonded valve plate as seen in FIG. 5. Upon removal from the brazing furnace, the valve plate is machined to the appropriate dimensions and bore 27 located therein.

It will be appreciated that the parts which make up the present valve plate may be formed in conventional stamping operations, resulting in a relatively low cost valve plate.

Figure 7:
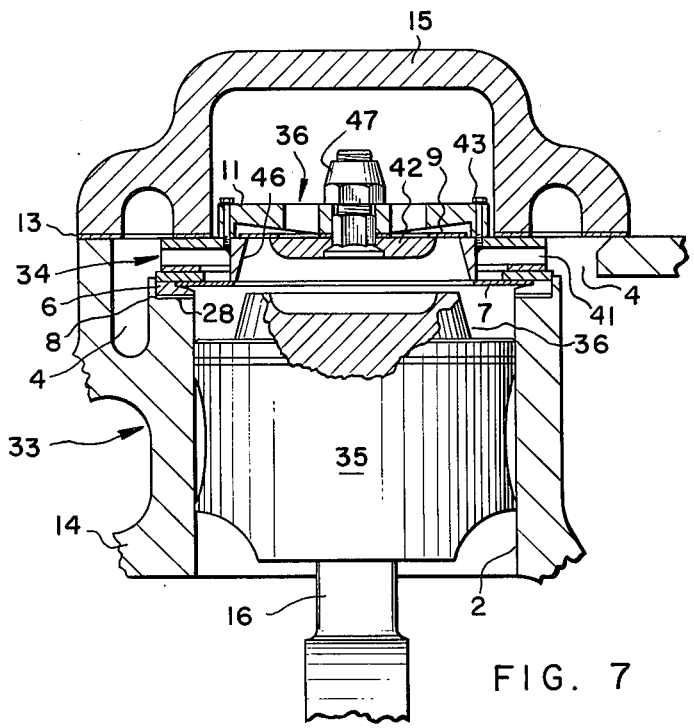
FIG. 7 is a partial sectional view of a reciprocating gas compressor including a valve plate according to a second embodiment of the present invention.
Figure 8:
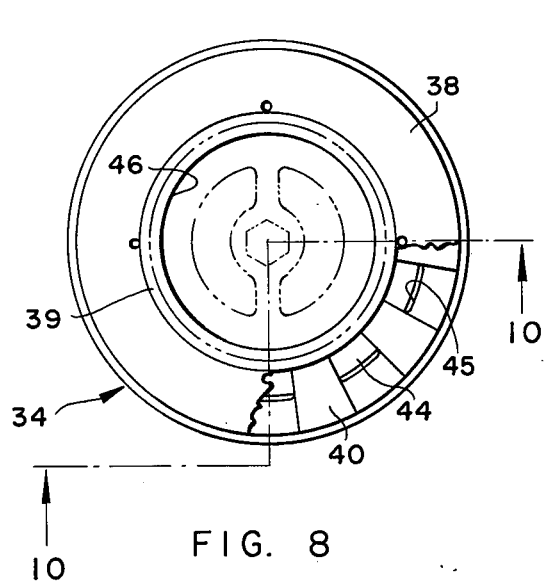
FIG. 8 is a top view, partially cut away, of the valve plate according to a second embodiment of the present invention.
Figure 9:
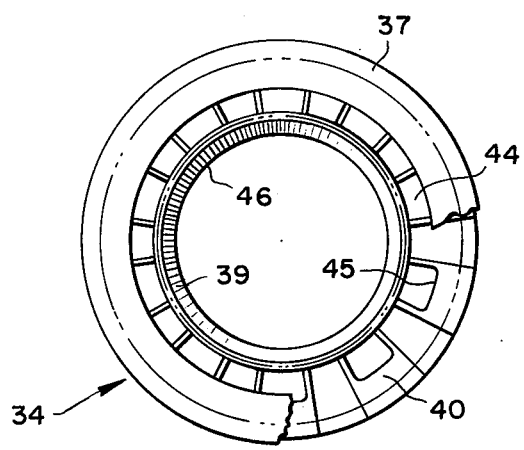
FIG. 9 is a bottom view, partially cut away, of the valve plate according to a second embodiment of the present invention.

Turning now to FIGS. 7 through 10 of the drawings, there is shown a second embodiment of the valve plate of the present invention. The compressor 33 as illustrated in FIG. 7 and its operation are similar in most respects to that of FIG. 1 and like reference numerals have been used to identify common elements.

The piston 35 of compressor 33 differs from that of FIG. 1 in that it has an upstanding crown as indicated at 36 which, at top dead center, occupies a corresponding annular opening in valve plate assembly 36. This design allows the compressor clearance volume to be reduced to a minimum value, resulting in high volumetric efficiency at increased compression ratios. It is this requirement that has led to the development of valve plate 34.

As seen in FIG. 7, valve plate assembly 36 comprises valve plate 34, to be described in detail hereinafter, suction valve 7 and its associated valve stop 6; discharge valve 9 and its associated valve stop 11; and a discharge valve seat 42 which is secured to discharge valve stop 11 by means of bolt and lock nut combination 47. Discharge valve stop 11 may be secured to valve plate 34 by any well-known fastening means such as machine screws 43, the resulting valve plate assembly being held in place in the same manner as that of FIG. 1. It may thus be noted that discharge valve seat 42 cooperates with the tapered central bore 46 of the valve plate so as to define an annular opening in the valve plate assembly to accept annular piston crown 36.

Operation of valve plate assembly 36 is basically the same as that of FIG. 1 and no further explanation thereof is deemed necessary for an understanding of the invention.

As seen in FIGS. 7 through 10, valve plate 34 is also fabricated as a laminate, including a lower annular member 37, upper annular member 38, and axially extending means in the form of element 39 which defines with the lower and upper members a suction gas flow area 41 of generally annular configuration. A corrugated element 40 similar to that used in the first embodiment is located in the suction gas flow area having its corrugations extending radially so as to define gas flow paths of minimal resistance. The corrugations communicate with suction port means 44 at their inner portions and, as in the first embodiment, portions of alternate corrugations which would otherwise block off suction port means 44 must be cut away as seen at 45. Moreover, the same flow considerations discussed in connection with the cut-away portions of the first embodiment apply with equal force here, including the presence of a fillet of brazing material between elements 38 and 39.

Figure 10:
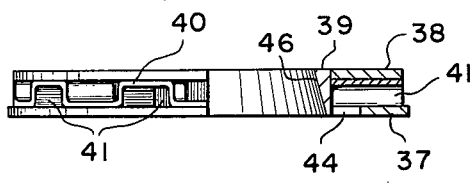
FIG. 10 is a side elevation view of the valve plate according to a second embodiment of the present invention, taken along the line 10—10 of FIG. 8.

As seen in FIG. 10, axially extending element 39 defines a tapered bore 46 corresponding to the shape of annular piston crown 36 and serving to define the discharge port means of the valve plate.

Although element 39 is shown as extending the entire thickness of the valve plate, it is within the scope of the invention that such element could be of lesser thickness and be "sandwiched" between the lower and upper members; or, as a further alternative, may be formed integrally with either the lower or upper member. The design as shown is preferred, however, in that it affords a continuous annular suction port opening 44.

This embodiment of the invention may also be fabricated using conventional furnace brazing techniques, and constructed of relatively low cost stamped components.

FIGS. 5 and 10 clearly illustrate the generous suction gas flow paths afforded by the present invention through the use of the corrugated element. Although the material going to make up said element occupies minimal volume between the lower and upper members, its design is such that a valve plate of sufficient strength results to withstand the forces attendant in a high speed reciprocating compressor.

Figure 6:
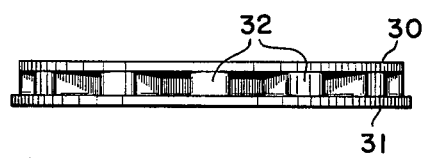
FIG. 6 is a side elevation view of a prior art laminated valve plate.

FIG. 6 has been included, illustrating a prior art laminated valve plate, in order to afford a comparison between its suction gas flow area and that of the present invention. Although its construction is similar in certain respects, including lower plate 31, upper plate 30 and a centrally located spacer element, the valve plate of FIG. 6 differs in that its spacer element includes integral radial web-like protrusions 32 to support members 30 and 31 about their peripheries. It is readily apparent that, due to the thickness of protrusions 32, an undesirable resistance to suction gas flow is introduced, a problem obviated by the design of the corrugated element in the present invention.

While the invention has been described with respect to a preferred embodiment, it is to be understood that modifications thereto will be apparent to those skilled in the art within the scope of the invention, as defined in the claims which follow.

I claim:

1. A valve plate for use in a reciprocating gas compressor comprising
   a. a lower member at least a portion of which defines a first substantially planar surface of generally annular configuration and having suction port means disposed adjacent a radially inner portion thereof,
   b. an upper member at least a portion of which defines a second substantially planar surface of generally annular configuration, said first and second surfaces facing each other in spaced relationship,
   c. axially extending means located adjacent radially inner portions of said first and second surfaces, and inwardly of said suction port means, said axially extending means defining therewith a suction gas flow area of generally annular configuration between said first and second planar surfaces,
   d. discharge port means passing axially through said valve plate and disposed radially inwardly of said suction gas flow area, and
   e. a corrugated element located in said suction gas flow area, the corrugations thereof defining suction gas flow paths in communication with said suction port means.

2. The valve plate of claim 1 wherein the outer peripheries said lower and upper members are of generally circular configuration.

3. The valve plate of claim 1 wherein said axially extending means comprises a cylindrical element having said discharge port means passing therethrough.

4. The valve plate of claim 1 wherein said corrugated element is of generally annular configuration and surrounds said axially extending means, the corrugations thereof extending in a radial direction, 5. The valve plate of claim 4 wherein said suction port means is of arcuate shape and wherein radially inner portions of said corrugations are in overlying relation thereto; radially inner portions of corrugations which would otherwise block off the suction port means being cut away so as to provide unrestricted gas flow paths through said suction port openings.

6. The valve plate of claim 1 wherein said corrugations are open about the periphery of the valve plate so as to provide unrestricted gas flow paths therethrough.

7. The valve plate of claim 1 wherein said corrugated element is bonded to the planar surfaces of said lower and upper members.

8. A valve plate for use in a reciprocating gas compressor comprising
   a. a lower substantially planar member of circular configuration, said member having a plurality of arcuate suction port openings disposed circumferentially thereabout, and a plurality of arcuate discharge port openings disposed circumferentially and spaced radially inwardly from said suction port openings,
   b. a circular spacer element of lesser diameter than said lower member overlying the discharge port openings thereof and having corresponding discharge openings therethrough,
   c. an upper substantially planar member of circular configuration overlying said spacer element and having a diameter greater than said element, further including discharge port openings corresponding to those of said lower member and said spacer element, and
   d. a corrugated element of generally annular configuration disposed between said lower and upper members and surrounding said spacer element, the corrugations of said element extending radially and defining suction gas flow paths in communication with the suction port openings of said lower member, said corrugations being open about the periphery of said valve plate so as to provide unrestricted gas flow paths therethrough.

9. The valve plate of claim 8 wherein said corrugations extend radially from a point immediately adjacent the spacer element, in overlying relationship to said suction port openings, to a point adjacent the outer periphery of the valve plate.

10. The valve plate of claim 9 wherein radially inner portions of alternate corrugations which would otherwise block off the suction port openings are cut away so as to provide unrestricted gas flow paths through said suction port openings.

11. The valve plate of claim 8 wherein said lower and upper members, the spacer element, and the corrugated element are bonded to one another.

12. A valve plate for use in a reciprocating gas compressor comprising a. a lower substantially planar member of generally annular configuration and having suction port means located adjacent a radially inner portion thereof, b. an upper substantially planar member of generally annular configuration in overlying spaced relationship to said lower member, c. an axial element extending from a point adjacent the inner periphery of said upper member to a point adjacent the suction port means of said lower member, said axial element defining with said lower and upper member a suction gas flow area of generally annular configuration; said axial element further having a central bore therethrough so as to define discharge port means, and d. a corrugated element of generally annular configuration disposed between said lower and upper members and surrounding said axial element, the corrugations of said element extending radially and defining suction gas flow paths in communication with said suction port means, said corrugations being open about the periphery of said valve plate so as to provide unrestricted gas flow paths therethough.

13. The valve plate of claim 12 wherein said corrugations extend radially from a point immediately adjacent said axial element, in overlying relationship to said suction port means, to a point adjacent the outer periphery of the valve plate.

14. The valve plate of claim 13 wherein radially inner portions of alternate corrugations which would otherwise block off the suction port means are cut away so as to provide unrestricted gas flow paths through said suction port means.

15. The valve plate of claim 12 wherein said lower and upper members, said axial element, and the corrugated element are bonded to one another.

16. The valve plate of claim 12 wherein said suction port means comprises a continuous annular opening between the inner periphery of the lower member and said axial element.

17. The valve plate of claim 12 wherein the central bore of said axial element is tapered inwardly from said lower member.

* * * * *